US012531962B2

(12) United States Patent
Suzuki et al.

(10) Patent No.: US 12,531,962 B2
(45) Date of Patent: Jan. 20, 2026

(54) VIRTUAL AMBIENT ILLUMINANCE SENSOR SYSTEM

(71) Applicant: Microsoft Technology Licensing, LLC, Redmond, WA (US)

(72) Inventors: Nobuyuki Suzuki, Kirkland, WA (US); Samu Matias Kallio, Redmond, WA (US); Kari Jussi Ropo, Redmond, WA (US); Simon Tao, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/363,175

(22) Filed: Jun. 30, 2021

(65) Prior Publication Data

US 2023/0007211 A1  Jan. 5, 2023

(51) Int. Cl.
*H04N 5/58* (2006.01)
*G09G 5/10* (2006.01)
(Continued)

(52) U.S. Cl.
CPC ............... *H04N 5/58* (2013.01); *G09G 5/10* (2013.01); *H04N 21/42202* (2013.01);
(Continued)

(58) Field of Classification Search
CPC .... H04N 5/58; H04N 21/41; H04N 21/42202; H04N 21/4854; G09G 5/10; G09G 2360/144
See application file for complete search history.

(56) References Cited

U.S. PATENT DOCUMENTS 11,306,897 B2 * 4/2022 Latsis ................... F21V 7/0033
2001/0050330 A1 * 12/2001 Mattison ................ H04N 3/155
348/E3.018

(Continued)

FOREIGN PATENT DOCUMENTS

CN   203968287 U   11/2014
CN   105979311 A    9/2016
(Continued)

OTHER PUBLICATIONS

"The screen brightness suddenly changes. (OLED TV)", Retrieved from: https://web.archive.org/web/20201028210714/https:/www.sony.co.in/electronics/support/articles/00173465, Oct. 28, 2020, 3 Pages.

(Continued)

*Primary Examiner* — Shaheda A Abdin
(74) *Attorney, Agent, or Firm* — Holzer Patel Drennan (57) ABSTRACT

The virtual ambient illuminance sensor system disclosed herein provides a method including detecting presence of an external device in vicinity of the device, wherein the external device is communicatively connected to the device, communicating with the external device to determine that the external device has an illuminance sensor, based at least in part on determining that the external device has an illuminance sensor; receiving an ambient illuminance snapshot from the external device, storing the ambient illuminance snapshot from the external device in the memory, and generating an ambient illuminance report for an operating system of the device.

20 Claims, 5 Drawing Sheets

(51) Int. Cl.
*H04N 21/422* (2011.01)
*H04N 21/485* (2011.01)
*H05B 47/11* (2020.01)

(52) U.S. Cl.
CPC ......... *H04N 21/4854* (2013.01); *H05B 47/11* (2020.01); *G09G 2360/144* (2013.01)

(56) References Cited

U.S. PATENT DOCUMENTS

| | | | |
|---|---|---|---|
| 2002/0118161 A1* | 8/2002 | Lin | G09G 3/3406 345/102 |
| 2004/0003051 A1* | 1/2004 | Krzyzanowski | H04L 12/2838 709/217 |
| 2010/0039414 A1 | 2/2010 | Bell et al. | |
| 2010/0079426 A1 | 4/2010 | Pance et al. | |
| 2013/0241950 A1* | 9/2013 | Mihara | G09G 3/36 345/589 |
| 2015/0348460 A1 | 12/2015 | Cox et al. | |
| 2017/0034281 A1* | 2/2017 | Jung | H04L 67/04 |
| 2017/0231016 A1* | 8/2017 | Park | H04W 76/10 |
| 2018/0218710 A1* | 8/2018 | Park | G09G 5/00 |
| 2019/0124387 A1* | 4/2019 | Baron | G06F 3/147 |
| 2019/0163543 A1* | 5/2019 | Alphin, III | G06F 3/0485 |
| 2019/0313050 A1* | 10/2019 | Wang | H04N 5/58 |
| 2020/0068689 A1 | 2/2020 | Yoon | |
| 2020/0260030 A1* | 8/2020 | Sakakibara | H04N 25/76 |

FOREIGN PATENT DOCUMENTS

| | | |
|---|---|---|
| EP | 3557570 A1 | 10/2019 |
| GB | 2572978 A | 10/2019 |

OTHER PUBLICATIONS

"Why does Samsung TV screen turn dark while watching?", Retrieved from: https://web.archive.org/web/20201112022128/https:/www.samsung.com/in/support/tv-audio-video/why-does-samsung-tv-screen-turn-dark-while-watching/, Nov. 12, 2020, 3 Pages.

Kučera, et al., "Towards Calm Displays: Matching Ambient Illumination in Bedrooms", In Proceedings of the ACM on Interactive, Mobile, Wearable and Ubiquitous Technologies, vol. 1, No. 2, Article 16, Jun. 2017, 21 Pages.

"International Search Report and Written Opinion Issued in PCT Application No. PCT/US22/030160", Mailed Date: Aug. 11, 2022, 10 Pages.

Communication pursuant to Article 94(3) Received in European Patent Application No. 22729985.6, mailed on Dec. 4, 2024, 6 pages.

* cited by examiner

VIRTUAL AMBIENT ILLUMINANCE SENSOR SYSTEM

BACKGROUND

Computing devices with displays may use a light sensor to trigger an adjustment of the brightness of the display. For example, a computing device such as a laptop, a tablet device, a mobile phone, etc., may include a light sensor that senses the ambient light and provide the information about the ambient illuminance to a processor of the computing device. The processor may use the information about the ambient illuminance to change one or more parameter controlling a display of the computing device. For example, of the information about the ambient illuminance indicates low level of illuminance, the brightness to a processor of a laptop, the processor may increase the brightness of the screen by increasing common voltage or other input provided to illuminate pixels of an LCD screen.

SUMMARY

The virtual ambient illuminance sensor system disclosed herein provides a method including detecting presence of an external device in vicinity of the device, wherein the external device is communicatively connected to the device, communicating with the external device to determine that the external device has an illuminance sensor, based at least in part on determining that the external device has an illuminance sensor; receiving an ambient illuminance snapshot from the external device, storing the ambient illuminance snapshot from the external device in the memory, and generating an ambient illuminance report for an operating system of the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

Computing devices are used by users in all kinds of different environments. For example, users use laptops, PCs, tablet devices, cellular phones, or other computing devices in various different environments such as offices, conference rooms, homes, at restaurants and coffee shops, outdoor venues, etc. It is common to adapt display luminance with embedded ambient light sensor in mobile systems, such as smartphones and portable (laptop) PCs, to provide the comfortable screen performance. On the other hand, standalone or stationary personal computer (PC) monitor devices do not have any light sensors embedded on the devices. The optical properties of the monitor devices are usually tuned by its user preference.

However, because the monitor devices are tuned mostly by the user preference, they are not capable to reproduce the perceptually accurate color, specifically when the ambient illuminance is different from the content producer ambience. In exceptional situations, where both of the content producer and content consumer use the professionally calibrated monitor devices in the dark ambient illuminance, the influence of the ambient illuminance may be removed. However, such solution is quite expensive and is not commonly used.

Implementations disclosed herein provides a virtual ambient illuminance sensor system that includes a virtual ambient illuminance sensing device attached on a monitor device. A virtual ambient illuminance sensing device driver incorporates pre-measured ambient illuminance sensing information. The virtual ambient illuminance sensor system may use the pre-measured information to adjust display color and luminance so as to reproduce perceptually accurate color on the monitor screen.

The technology disclosed herein solves a technical problem of managing brightness of a standalone device that does not have an illuminance sensor. Specifically, the implementations disclosed herein allows the standalone device, such as a standalone PC or a monitor, to receive a snapshot of ambient illuminance levels from a mobile device including an illuminance sensor. Subsequently, the snapshot of the ambient illuminance levels is used to determine VCO levels provided to the pixels of an output screen of such standalone device. Furthermore, such snapshot of ambient illuminance levels is saved for future use. As a result, the pixels of such standalone device are illuminated such that it provides pleasant user experience. Also, these implementations are advantageous to the standalone device as it eliminates the need for the standalone device to be modified to have illuminance sensor. Another advantage of the implementations disclosed herein is that the snapshot of ambient illuminance is received from a mobile device that is in the vicinity of the standalone device, thus resulting in better user experience.

Figure 1:
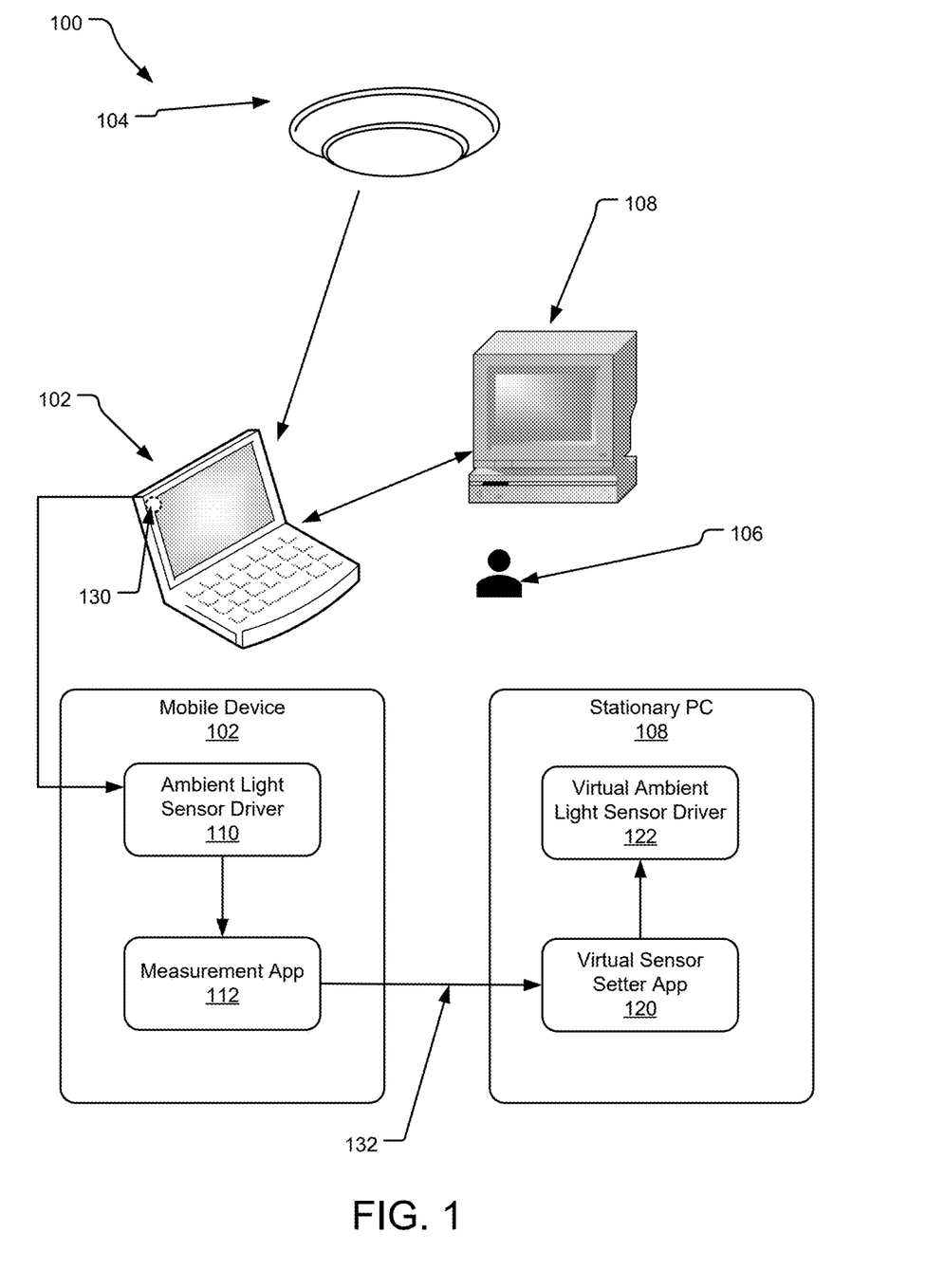
FIG. 1 illustrates an example block diagram of a virtual ambient illuminance sensor system disclosed herein.

FIG. 1 illustrates an example block diagram of a virtual ambient illuminance sensor system 100 disclosed herein. Specifically, the virtual ambient illuminance sensor system 100 discloses an implementation where a stationary personal computer (PC) is communicatively attached with a mobile device 102. The mobile device 102 may be a laptop, a tablet, or another mobile device with capability for ambient illuminance sensing capability. In the illustrated implementation, the mobile device 102 has an illuminance sensor 130 that senses ambient illuminance, such as illuminance from a light source 104. The ambient illuminance sensor 112 may be implemented as any light sensor that measures the level of illuminance in the vicinity of the computing device 102 in lux or other appropriate units. The ambient illuminance sensor 130 may be implemented with ambient color sensing capability as well as illuminance. For example, the ambient illuminance sensor 130 may be implemented using a photovoltaic light sensor, a phototube, a photo-emissive device, a photo-conductive device, a photo-junction device, a light-detective resistor, a photodiode, a photo-transistor, etc. In one implementation, the ambient illuminance sensor 130 may generate a series of illuminance values measured at a predetermined time period, such as every millisecond (ms), every second, etc. These series of illuminance values may be used by an operating system of the computing device 102 to adjust illuminance levels of an output screen.

In the illustrated implementation, the output from the ambient illuminance sensor 130 may be input to an ambient light sensor driver 110 of the mobile device 110. A measurement application 112 implemented on the mobile device 102 may sample the illuminance data input to the ambient light sensor driver 110. Specifically, the measurement application 112 may have be communicatively connected to a virtual sensor setter application 120 configured on the stationary PC 108. For example, the measurement application 112 may have be communicatively connected to a virtual sensor setter application 120 via a communication connection 132. Alternatively, the communication connection 132 may be a wireless connection, an HDMI connection, etc.

The virtual sensor setter application 120 may be configured to determine if the mobile device 102 is in the vicinity of the stationary PC. In one implementation, such determination may be made by communicating with the mobile device over the communication connection 132. Ascertaining that the mobile device 102 is in the vicinity of the stationary PC 108 allows to make sure that the illuminance level of the light incident upon the stationary PC 108 is substantially similar to the illuminance level of the light incident upon the mobile device 102. This provides advantageous user experience to the user 106 using the standalone PC 108.

In one implementation, the measurement application 112 is configured to take a snapshot of the illuminance levels at the mobile device 102 and communicate the illuminance level snapshot to the virtual sensor setter application 120 of the standalone PC 108. The virtual sensor setter application 120 may save the snapshot in local memory of the standalone PC 108 for later use. For example, if the standalone PC 108 is configured in an office of the user 106, anytime a mobile device in the vicinity of the standalone PC 108, such as the mobile device 102, is communicatively connected to the standalone PC 108, a snapshot of the illuminance report is saved on the local memory of the standalone PC 108. Thus, if the next day, even if the user 106 does not connect the mobile device 102 to the standalone PC 108, the standalone PC 108 is able to use the illuminance snapshot, which most likely is a good representation of the illuminance at the standalone PC 108 resulting from the light source 104 located in the office of the user 106. Therefore, the virtual ambient illuminance sensor system 100 provides a technical advantage by allowing the stationary PC 108 to adjust the VCO levels for the pixels of its display screen without having to have sensors thereupon and even if the mobile device 102 is disconnected from the stationary PC 108, the VCO levels are set to be in accordance with the ambient illuminance from the light source 104 around the stationary PC 108.

As a result of using the snapshot of the illuminance levels as measured by a mobile device having an illuminance sensor, the illuminance of the pixels on an output screen of the standalone PC 108 is managed so as to give pleasant experience to a user 106. Furthermore, even when the user 106 folds the mobile device 102 and/or disconnects it from the standalone PC 108, the snapshot of illuminance saved by the virtual sensor setter application 120 may be used by a virtual ambient light sensor driver 122 to maintain the VCO levels of the pixels of the standalone PC 108 and therefore the illuminance of the output screen of the standalone PC 108 in view of the illuminance generated by the light source 104.

Figure 2:
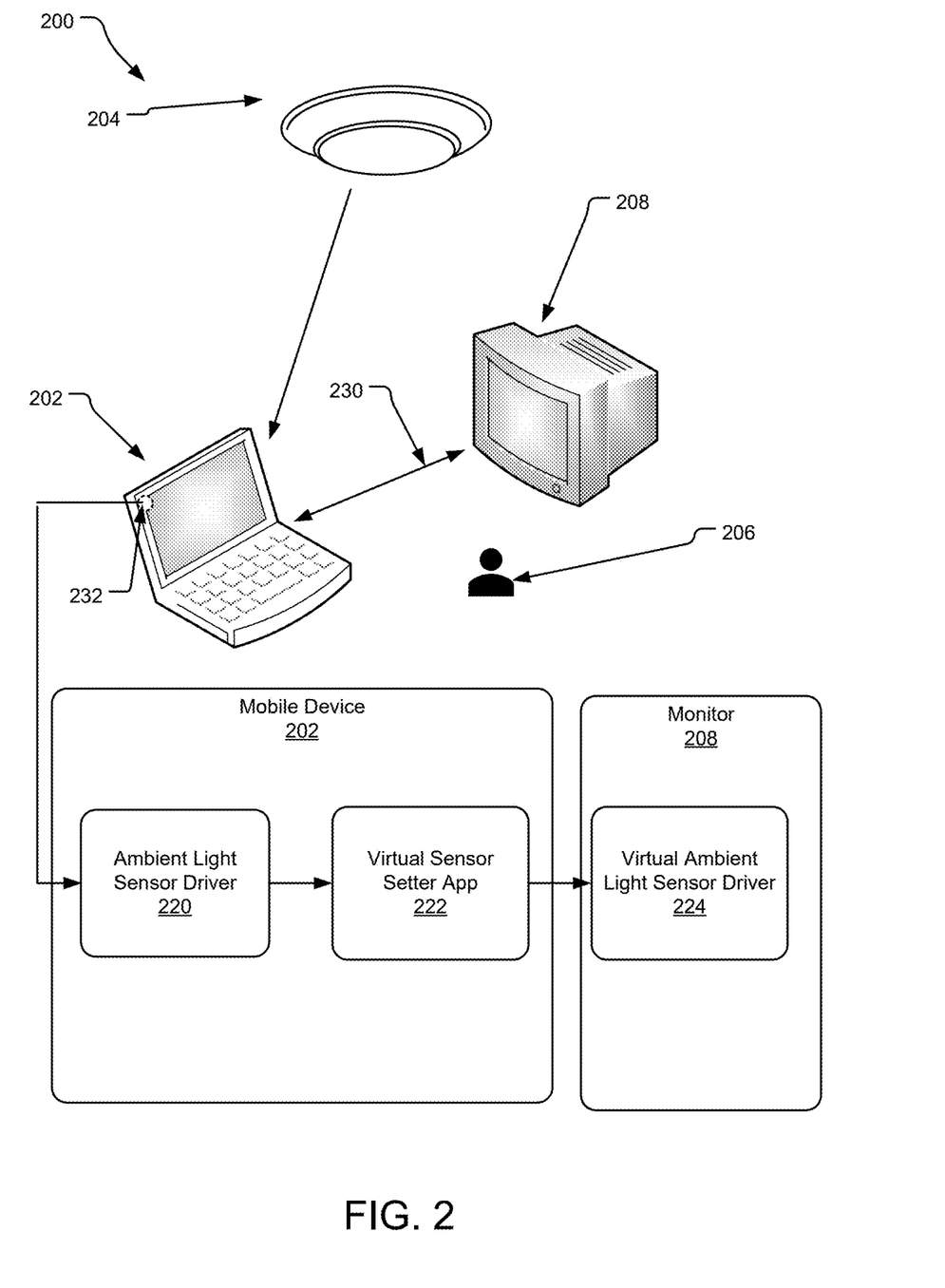
FIG. 2 illustrates an alternative example block diagram of a virtual ambient illuminance sensor system disclosed herein.

FIG. 2 illustrates an alternative block diagram of a virtual ambient illuminance sensor system 200 disclosed herein. Specifically, the virtual ambient illuminance sensor system 200 may include a mobile device 202 that is connected to a standalone monitor 208 via a communication connection 230. For example, the communication connection 230 may be an HDMI cable. The mobile device 202 includes an ambient illuminance sensor 232 that generates a series of illuminance signals that are communicated to an ambient light sensor driver 220.

The ambient light sensor driver 220 may be used to drive an output device, such as a screen of the mobile device 202. However, in the illustrated implementation, the ambient light sensor driver 220 also generates an output of a snapshot of the ambient illuminance that is communicated to a virtual sensor setter application 222. In one implementation, the virtual sensor setter application 222 is run at a predetermined ambient illumination condition. An example of the predetermined illumination condition may be the stored sensor information from when the stand-alone monitor was used by the mobile device last time to replicate the ambient illuminance sensor 232 to a virtual ambient light sensor driver 224. The output of the sensor setter application 222 to the driver 224 may be the snapshot of the ambient illuminance sensing data. Once it is determined that the data from the ambient illuminance sensor 230 is replicated to the virtual ambient light sensor driver 224, the ambient illuminance sensor 202 of the mobile device 202 may be disabled or the mobile device 202 may be closed.

In an example use case of the virtual ambient light sensor driver 224 disclosed in FIG. 2, the mobile device 202 may be active but the ambient illuminance sensor 232 may be disabled. For example, the lid of the mobile device 202 may be closed with the mobile device 202 connected to external monitor 208 as well as external keyboard/mouse, as if it is used as desktop PC. In this condition, ambient illuminance would not generate the sensor report and therefore, the display of the monitor 208 cannot be adapted to the ambient illuminance. With the implementation disclosed in FIG. 2, the virtual ambient light sensor driver 224 stores the last known good ambient illuminance data, such as from when the lid of the mobile device 202 was open with the illuminance sensor 232 active. As a result, the display subsystem of the monitor 208 is able to use the sensor information to adapt the display to the ambient illuminance.

Furthermore, the above implementation provides an additional advantage of using the mobile device 202 with the lid closed and still the monitor 208 being able to adjust its display to the ambient illuminance. Keeping the lid of the mobile device 202 closed allows the mobile device to be used for longer period of time and therefore, preserving its battery life. Thus, providing the monitor 208 with the virtual ambient light sensor driver 224 allows not only extended use of the mobile device 202 but results in less damage to the display of the mobile device 202 due to extended use of screen saves on the display.

Subsequently, the operations for managing the illuminance of the monitor device 208 may be managed by the virtual ambient light sensor driver 224. Specifically, the virtual ambient light sensor driver 224 may adjust the VCO levels of the pixels of the monitor device 208 using the replicated data from the ambient illuminance sensor 230. As a result, the monitor device 208 is able to manage the illuminance levels of its output screen in consideration of the ambient illuminance provided by the light source 204 even when it does not have an illuminance sensor or even when it is not connected to any mobile device, such as the mobile device 202. Thus, unless the ambient illuminance condition is changed and the user 206 thinks to replicate the sensing information from mobile device 202 once again, it is unnecessary to perform replication process, and the monitor device 208 can reproduce the correct illuminance and color on its display screen for a long usage period.

Figure 3:
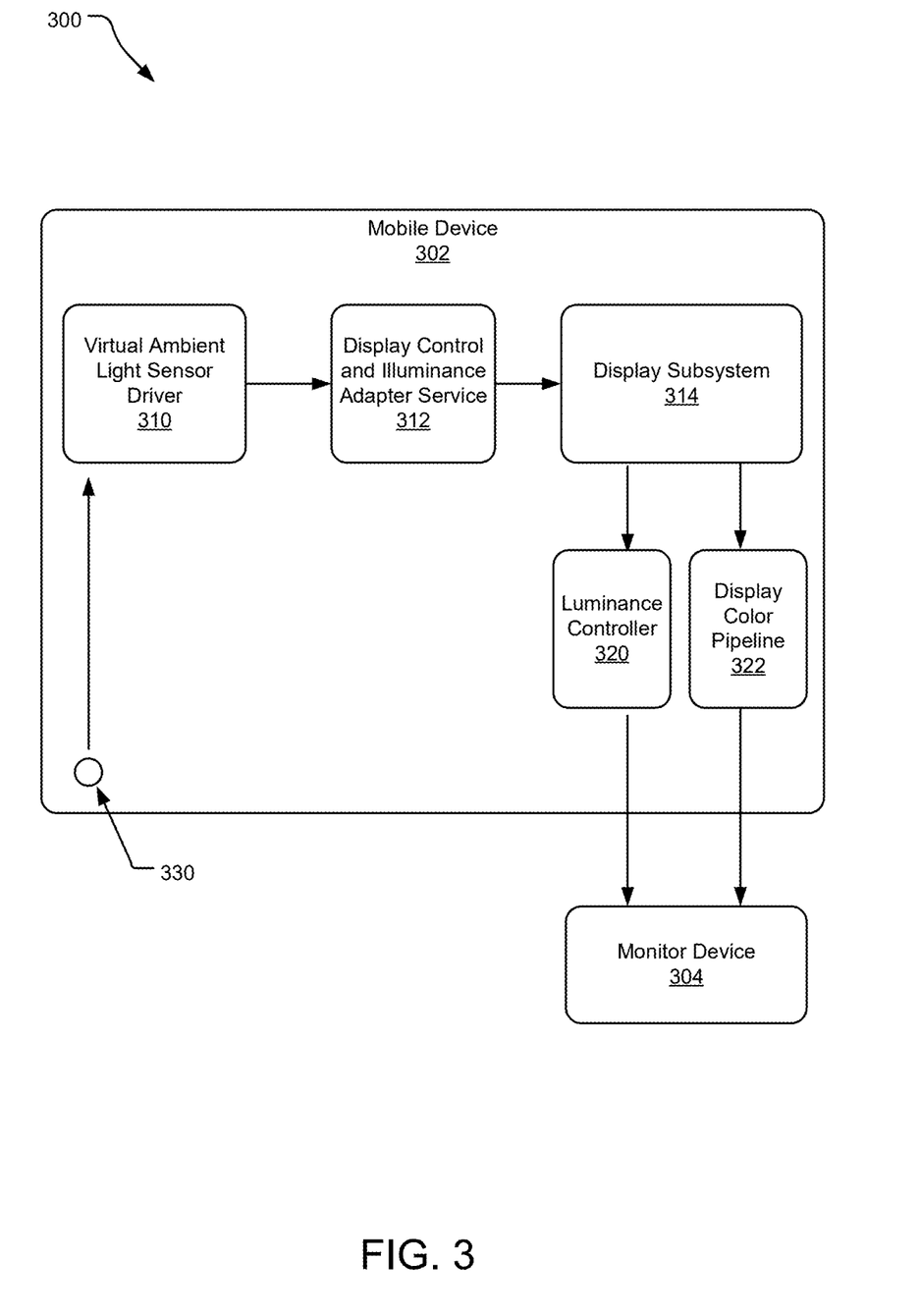
FIG. 3 illustrates another alternative example block diagram of a virtual ambient illuminance sensor system disclosed herein.

FIG. 3 illustrates another alternative block diagram of a virtual ambient illuminance sensor system 300 disclosed herein. Specifically, the virtual ambient illuminance sensor system 300 includes a mobile device 302 that may be communicatively connected to a monitor device 304 at least for some time period. The mobile device 302 may be a device such as a tablet device, a laptop, etc., that has an ambient illuminance sensor 330 thereupon. The ambient illuminance sensor 330 may be implemented with ambient color sensing capability as well as illuminance. For example, the ambient illuminance sensor 330 may be implemented using a photo-voltaic light sensor, a phototube, a photo-emissive device, a photo-conductive device, a photo-junction device, a light-detective resistor, a photodiode, a photo-transistor, etc.

A virtual ambient light sensor driver 310 implemented on the mobile device 302 may receive a series of illuminance and color data from the ambient illuminance sensor 330 and generate illuminance and color data that may be used by display screens to adjust the VCO levels and the color input signals for its pixels. The output from the virtual ambient light sensor driver 310 is used by a display control and illuminance adapter service 312 to control the VCO levels and the color input signals for a display screen pixels. These values are submitted to a display subsystem 314 of the mobile device 302, which adapts the attached monitor color and luminance of a display screen.

In the illustrated implementation, a luminance controller 320 and a display color pipeline 322 may be configured to receive the luminance and color levels from the display subsystem 314 and communicate them to the monitor device 304. For example, the monitor device 304 may not include any illuminance or color sensor. Furthermore, the monitor device may be configured to communicatively connect with the mobile device 302 using an HDMI cable or other communication mechanism. The monitor device 304 may use the illuminance and color data received from the mobile device 302 to adjust its display screen.

Figure 4:
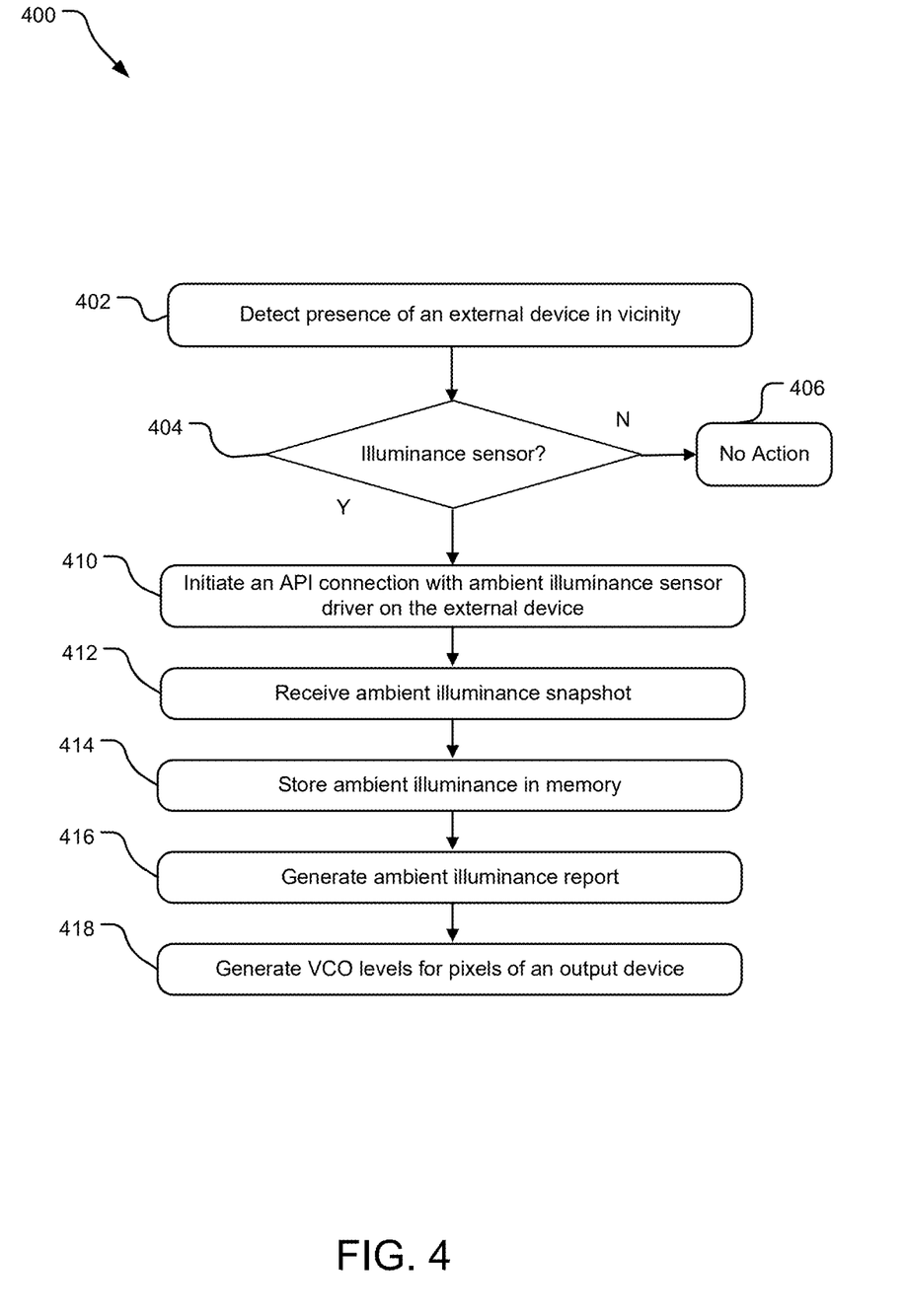
FIG. 4 illustrates example operations for the virtual ambient illuminance sensor system disclosed herein.

FIG. 4 illustrates operations 400 for the virtual ambient illuminance sensor system disclosed herein. One or more of the operations 400 may be implemented on a monitor device or a standalone PC. Specifically, an operation 402 detects presence of an external device in vicinity of such standalone PC or monitor device. For example, the operation 402 may detect the presence of the external device as a result of an HDMI connection to such external device. An operation 404 determines if the external device includes an illuminance sensor. For example, the operation 404 may involve evaluating an input received from the mobile device to determine if the external device has an illuminance sensor. If it is determined that the external device has an illuminance sensor, an operation 410 initiates an API connection with an ambient illuminance sensor driver on the external device.

Subsequently, an operation 412 receives an ambient illuminance snapshot from the ambient illuminance sensor driver of the external device and an operation 414 stores the illuminance snapshot in the local memory. An operation 416 may generate and ambient illuminance report that may be used by the operating system of the device and an operation 418 generates VCO levels and other signals necessary for the pixels of an output device, such as a display screen.

Figure 5:
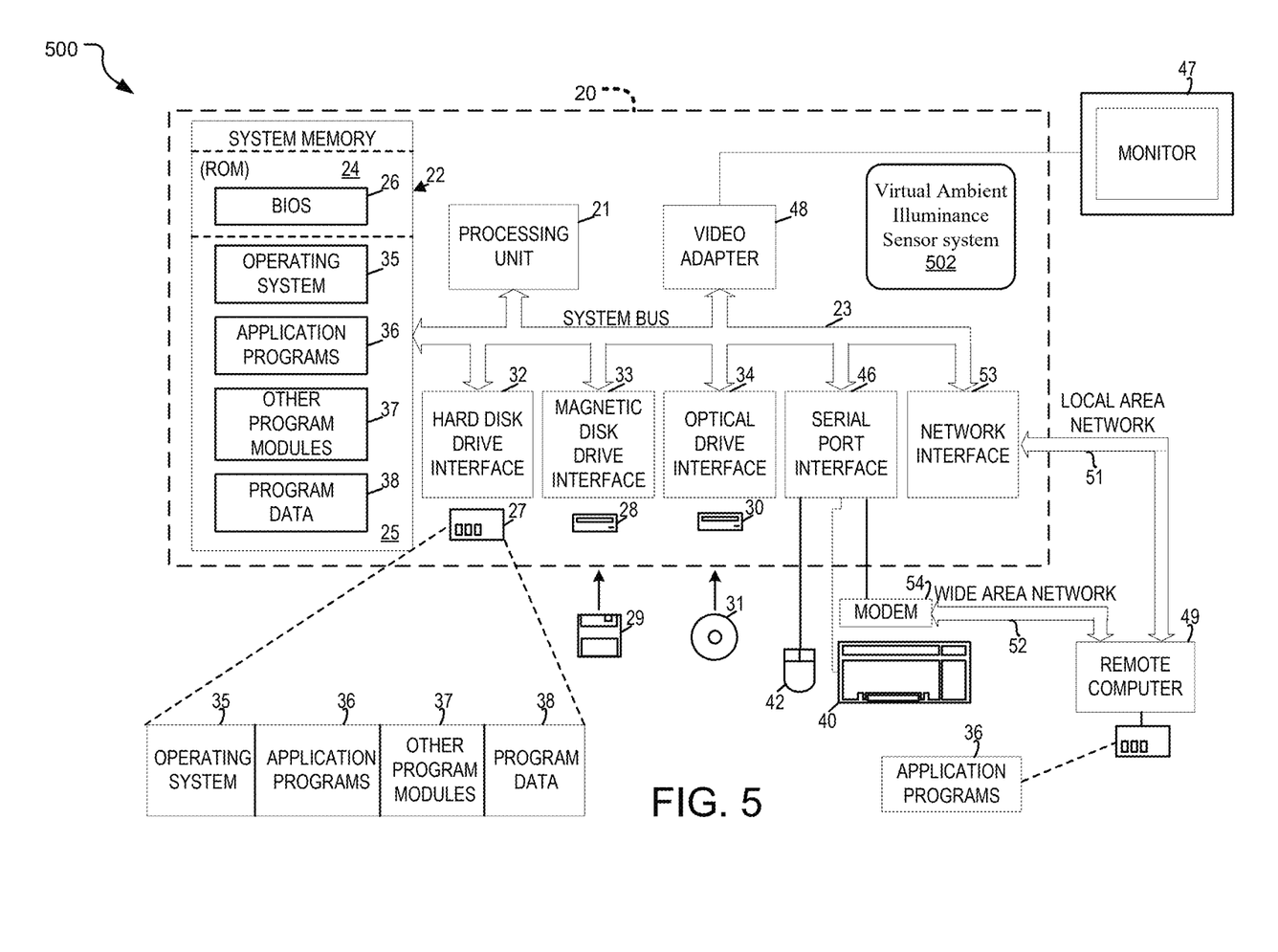
FIG. 5 illustrates an example computing system that may be useful in implementing the described technology.

FIG. 5 illustrates an example system 500 that may be useful in implementing the virtual ambient illuminance sensor system disclosed herein. The example hardware and operating environment of FIG. 5 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 5, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random-access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device, or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets, and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for a device capability model sharing system may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a virtual ambient illuminance sensor system 502 may be implemented on the computer 20 as an application program 36 (alternatively, the virtual ambient illuminance sensor system 502 may be implemented on a server or in a cloud environment). The virtual ambient illuminance sensor system 502 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared, and other wireless media.

An implementation disclosed herein includes one or more physically manufactured computer-readable storage media, encoding computer-executable instructions for executing on a computer system a computer process, the computer process including detecting presence of an external device in vicinity of the device, wherein the external device is communicatively connected to the device, based at least in part on determining that the external device has an illuminance sensor; receiving an ambient illuminance snapshot from the external device, storing the ambient illuminance snapshot from the external device in the memory, and generating an ambient illuminance report for an operating system of the device.

An alternative implementation of the virtual ambient illuminance sensor system disclosed herein implements a method including detecting presence of an external device in vicinity of the device, wherein the external device is communicatively connected to the device, communicating with the external device to determine that the external device has an illuminance sensor, based at least in part on determining that the external device has an illuminance sensor; receiving an ambient illuminance snapshot from the external device, storing the ambient illuminance snapshot from the external device in the memory, and generating an ambient illuminance report for an operating system of the device.

In another implementation, a device disclosed herein includes a memory, one or more processing units and a virtual sensor system stored in the memory and executable by the one or more processor units, the virtual sensor system encoding computer-executable instructions on the memory for executing on the one or more processor units a computer process, the computer process including detecting presence of an external device in vicinity of the device, wherein the external device is communicatively connected to the device, communicating with the external device to determine that the external device has an illuminance sensor, based at least in part on determining that the external device has an illuminance sensor; receiving an ambient illuminance snapshot from the external device, storing the ambient illuminance snapshot from the external device in the memory, and generating an ambient illuminance report for an operating system of the device.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. One or more physically manufactured computer-readable storage media, encoding computer-executable instructions for executing on a computer system a computer process, the computer process comprising:
   detecting presence of an external computing device in vicinity of a first computing device, wherein the external computing device is communicatively connected to the first computing device and wherein the first computing device does not include an illuminance sensor;

determining that an illuminance level of light incident upon the external computing device is substantially similar to the illuminance level of the light incident upon the first computing device based on determining that the external computing device is in the vicinity of the first computing device;

based at least in part on determining that the external computing device has an illuminance sensor and that an illuminance level of light incident upon the external computing device is substantially similar to the illuminance level of the light incident upon the first computing device;

receiving an ambient illuminance snapshot from the external computing device;

storing the ambient illuminance snapshot from the external computing device in a memory of the first computing device; and generating an ambient illuminance report for an operating system of the first computing device using the ambient illuminance snapshot from the external computing device.

2. The one or more physically manufactured computer-readable storage media of claim 1, wherein the computer process further comprising:

detecting presence of a plurality of external computing devices in the vicinity of the first computing device; and selecting one of the plurality of external computing devices to receive the ambient illuminance snapshot from the selected external computing device.

3. The one or more physically manufactured computer-readable storage media of claim 1, wherein the first computing device is a computer monitor.

4. The one or more physically manufactured computer-readable storage media of manufacture of claim 1, wherein the external computing device is a mobile device and wherein the illuminance sensor of the external computing device is disabled while the external computing device is communicatively connected to the first computing device.

5. The one or more physically manufactured computer-readable storage media of claim 1, wherein the computer process further comprising:

detecting presence of a plurality of external computing devices in the vicinity of the first computing device; and selecting ambient illuminance snapshot received from one of the plurality of external computing devices.

6. The one or more physically manufactured computer-readable storage media of claim 1, wherein the computer process further comprising initiating an API communication connection with an ambient illuminance sensor driver on the external computing device based at least in part on determining that the external computing device has an illuminance sensor.

7. The one or more physically manufactured computer-readable storage media of claim 6, wherein the computer process further comprising disabling the API communication connection with the ambient illuminance sensor driver on the external computing device after storing the ambient illuminance snapshot from the external computing device in the memory.

8. A method, comprising:

detecting presence of an external computing device in vicinity of a first computing device, wherein the external computing device is communicatively connected to the first computing device and wherein the first computing device does not include an illuminance sensor;

determining that an illuminance level of light incident upon the external computing device is substantially similar to the illuminance level of the light incident upon the first computing device based on determining that the external computing device is in the vicinity of the first computing device;

based at least in part on determining that the external computing device has an illuminance sensor and that an illuminance level of light incident upon the external computing device is substantially similar to the illuminance level of the light incident upon the first computing device;

receiving an ambient illuminance snapshot from the external computing device;

storing the ambient illuminance snapshot from the external computing device in a memory of the first computing device; and generating an ambient illuminance report for an operating system of the first computing device using the ambient illuminance snapshot from the external computing device.

9. The method of claim 8, further comprising:

detecting presence of a plurality of external computing devices in the vicinity of the first computing device; and selecting one of the plurality of external computing devices to receive the ambient illuminance snapshot from the selected external computing device.

10. The method of claim 8, wherein the first computing device is a computer monitor.

11. The method of claim 8, wherein the external computing device is a mobile device.

12. The method of claim 8, further comprising generating voltage controlled oscillator (VCO) levels for pixels of an output device of the first computing device based at least in part on the ambient illuminance report.

13. The method of claim 8, further comprising initiating an API communication connection with an ambient illuminance sensor driver on the external computing device based at least in part on determining that the external computing device has an illuminance sensor.

14. A device, comprising:

memory;

one or more processor units;

a virtual sensor system stored in the memory and executable by the one or more processor units, the virtual sensor system encoding computer-executable instructions on the memory for executing on the one or more processor units a computer process, the computer process comprising:

detecting presence of an external computing device in vicinity of a first computing device, wherein the external computing device is communicatively connected to the first computing device and wherein the first computing device does not include an illuminance sensor;

determining that an illuminance level of light incident upon the external computing device is substantially similar to the illuminance level of the light incident upon the first computing device based on determining that the external computing device is in the vicinity of the first computing device;

based at least in part on determining that the external computing device has an illuminance sensor and that an illuminance level of light incident upon the external computing device is substantially similar to the illuminance level of the light incident upon the first computing device;

receiving an ambient illuminance snapshot from the external computing device;

storing the ambient illuminance snapshot from the external computing device in a memory of the first computing device; and generating an ambient illuminance report for an operating system of the first computing device using the ambient illuminance snapshot from the external computing device.

15. The device of claim 14, wherein the first computing device is a computer monitor.

16. The device of claim 14, wherein the external computing device is a mobile device.

17. The device of claim 14, wherein the computer instructions further comprising:

detecting presence of a plurality of external computing devices in the vicinity of the first computing device; and selecting one of the plurality of external devices to receive the ambient illuminance snapshot from the selected external computing device.

18. The device of claim 14, further comprising a virtual ambient light sensor driver configured to receive the ambient illuminance report and to generate voltage controlled oscillator (VCO) levels for pixels of an output device of the first computing device based at least in part on the ambient illuminance report.

19. The device of claim 14, wherein the computer process further comprising initiating an API communication connection with an ambient illuminance sensor driver on the external computing device based at least in part on determining that the external computing device has an illuminance sensor.

20. The device of claim 19, wherein the computer process further comprising disabling the API communication connection with the ambient illuminance sensor driver on the external computing device after storing the ambient illuminance snapshot from the external computing device in the memory.

* * * * *